United States Patent [19]

Giovanzana

[11] Patent Number: 5,214,453
[45] Date of Patent: May 25, 1993

[54] PROGRESSIVE ECCENTRICITY MULTIFOCAL CONTACT LENS AND MANUFACTURING PROCESS THEREOF

[76] Inventor: Mario Giovanzana, Via Cherubini, 6, Milano, Italy

[21] Appl. No.: 613,660
[22] PCT Filed: May 8, 1989
[86] PCT No.: PCT/IT89/00033
    § 371 Date: Nov. 23, 1990
    § 102(e) Date: Nov. 23, 1990
[87] PCT Pub. No.: WO89/11672
    PCT Pub. Date: Nov. 30, 1989

[30] Foreign Application Priority Data

May 24, 1988 [IT] Italy ................. 20707 A/88

[51] Int. Cl.[5] ............................................. G02C 7/04
[52] U.S. Cl. .................................... 351/161; 351/177
[58] Field of Search ............... 351/160 R, 150 H, 161, 351/162

[56] References Cited

U.S. PATENT DOCUMENTS 4,580,882  4/1986  Nuchman et al. ............. 351/177 X

Primary Examiner—Scott J. Sugarman
Attorney, Agent, or Firm—James P. Hanrath; Thomas R. Vigil

[57] ABSTRACT

A multifocal contact lens, having progressive eccentricity in an area coaxial relative to the optical center, is obtained through the lens outer surface turning on a lathe, in the optical area involved, by means of a computer controlled lathe, based on special computer programs. The contact lens provided as said above allows vision problems concerning both far range vision and near range vision, in miopic or hypermetropic subjects, to be simultaneously corrected.

2 Claims, 4 Drawing Sheets

PROGRESSIVE ECCENTRICITY MULTIFOCAL CONTACT LENS AND MANUFACTURING PROCESS THEREOF

BACKGROUND OF THE INVENTION

This invention concerns contact lenses adapted to ensure correction, through a single dioptric means, for both visual defects related to far range vision (miopia and hypermetropia), and visual defects related to near range vision (presbyopia).

Furthermore, this invention concerns the process for manufacturing said contact lenses, through use of any type of lathe, both numerically controlled and "duplicating" lathe, controlled by a computer or electronic data processing equipment, according to special process computer programs. As it is already known, in the lenses for conventional glasses, the possibility to see correctly both in the near distance range and in the far distance range, is provided by dividing said lenses in two parts, wherein the upper part enables far range vision while the lower part enables near range vision, owing to the eye motions relative to the lens. Therefore, said lenses are called bifocal lenses. Also known are trifocal and multifocal lenses, both with visible or invisible edge. As it should be apparent, this type of lens partitioning in two or more asymmetrical parts is not feasable in contact lenses, since the lens constantly follows the eye motions, and no relative displacements are possible. While striving to overcome said drawback with contact lenses, a compromise has been made, trying to exploit the capacity of the pupil to adapt to the different light conditions. Therefore, it has been contrived to divide the contact lens in two or more concentric areas having a different degree of spherical curvature, whereby the pupil, when expanding or contracting, can use the different areas, according to the light available, while being supported in this process by the discrimination and synthesis capacity of the brain. However, it has been noticed that said lenses having areas with different spherical curvature gave a blurred vision (for instance split vision) and the eye got easily tired.

SUMMARY OF THE INVENTION

The object of this invention is to overcome the above drawbacks by providing contact lenses based on the inventive concept that the central spherical area is designed to provide a perfect far range vision in any light condition, and an optimum near range correction by utilizing the single or plural immediately adjacent concentric areas, having non-spherical progressive curvature. A further important feature of the contact lenses according to this invention is the fact that all corrections are obtained by suitable machining operations of the lens outer surface, both in the neutral and in the positive and negative lenses.

The near range vision correction mechanism is based on the development of at least an external curve whose dioptric power progressively changes while proceeding in a radial direction from the inside to the outside, said difference in dioptric power from the innermost to the outermost point of the area taken into consideration being given by the algebraic sum of the diopters referred to the two visual defects. The term "progressive" is used herein to indicate that the lens outer surface curvature changes according to a perfect linear progression between the two end values. Said geometrical pattern is obtained by progressively reducing the outer radius, starting from the central spherical area, at a progressive rate and such as to obtain the sagittal of the curve provided for near range correction. The higher is the difference between the far range correction and the near range correction, the faster will be the progression. This type of contact lens may be manufactured by means of numerically controlled lathes, or "duplicating lathes" of any model, and may be applied to any type of material, both hard and soft.

For the purpose of making this invention more easily understood, some definitions of terms currently used in the art of contact lenses. The definition "base radius" means the radius of the spherical surface facing the eye; the term "sagittal" means the base depth; "optical area" means the diameter of the lens area assigned to vision; the "lenticular radius" is the radius of the connecting curve between the junction point and the lens edge; the term "junction" means the meeting position between two curves, or better the circumference separating two adjacent areas; by the definition "raising at the edge" there is meant the difference between the sagittal of the base curve considered on the lens total diameter, and the final sagittal.

BRIEF DESCRIPTION OF THE DRAWINGS

This invention will be disclosed more particularly in the following, based on some embodiments thereof, mentioned herein for exemplary and non limiting purposes, and described by referring to the attached drawing, wherein.

DETAILED DESCRIPTION OF THE PREFERRED EMBODIMENTS

Figure 1:
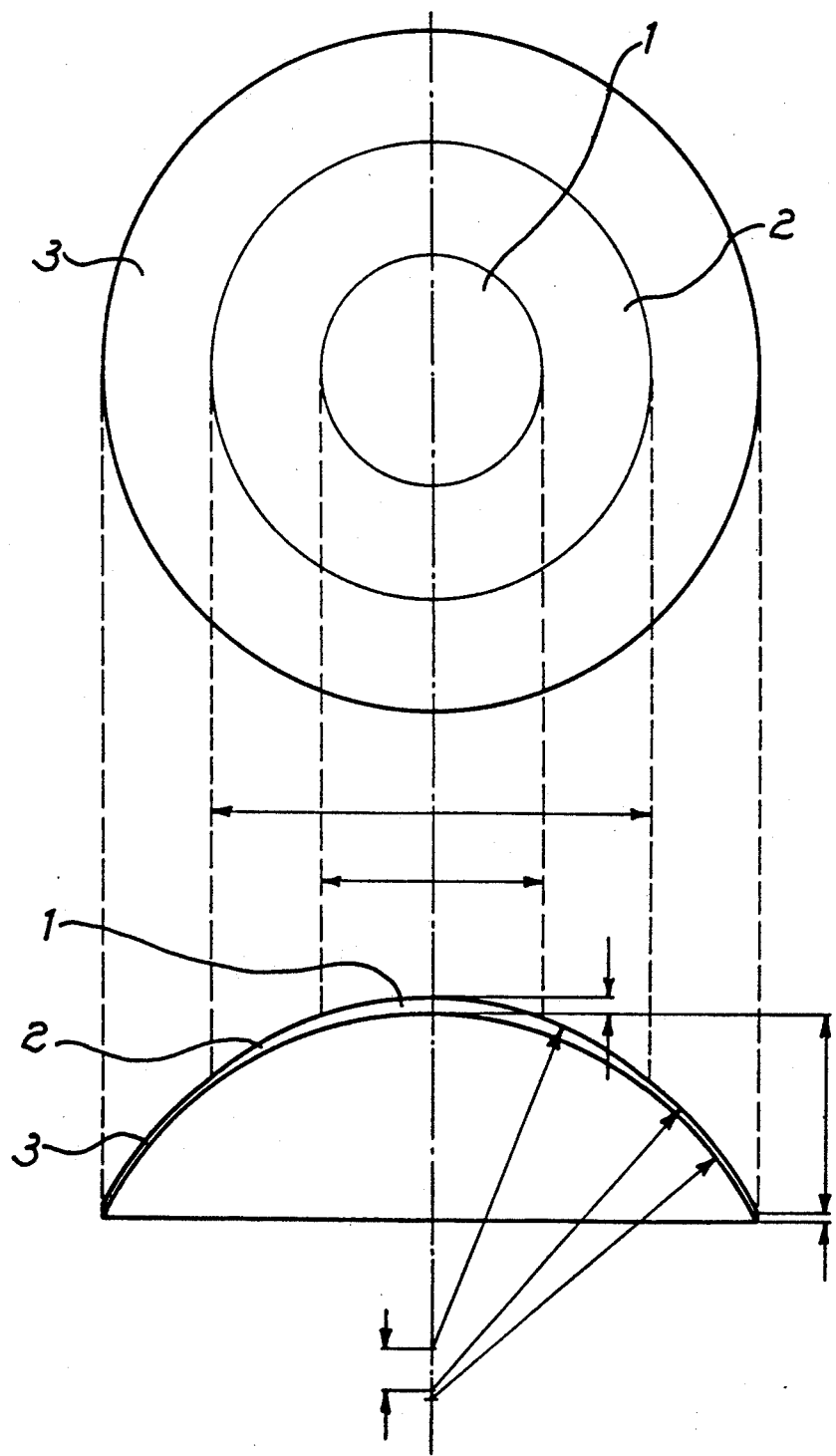
FIG. 1 shows schematically a plan view and a diametral cross section of a multifocal positive lens of this invention.
Figure 2:
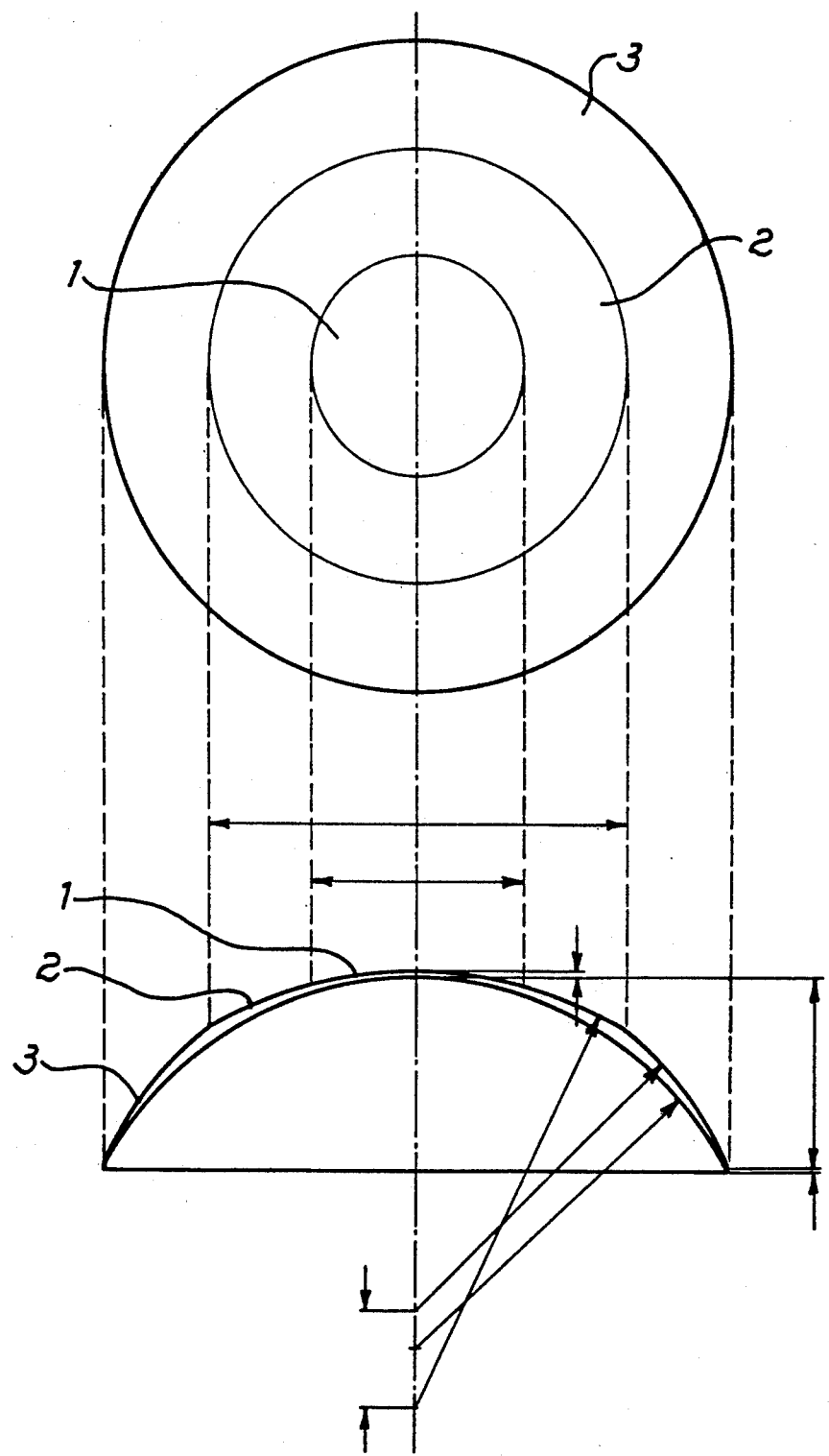
FIG. 2 shows schematically a plan view and a cross section of a multifocal negative lens.
Figure 3:
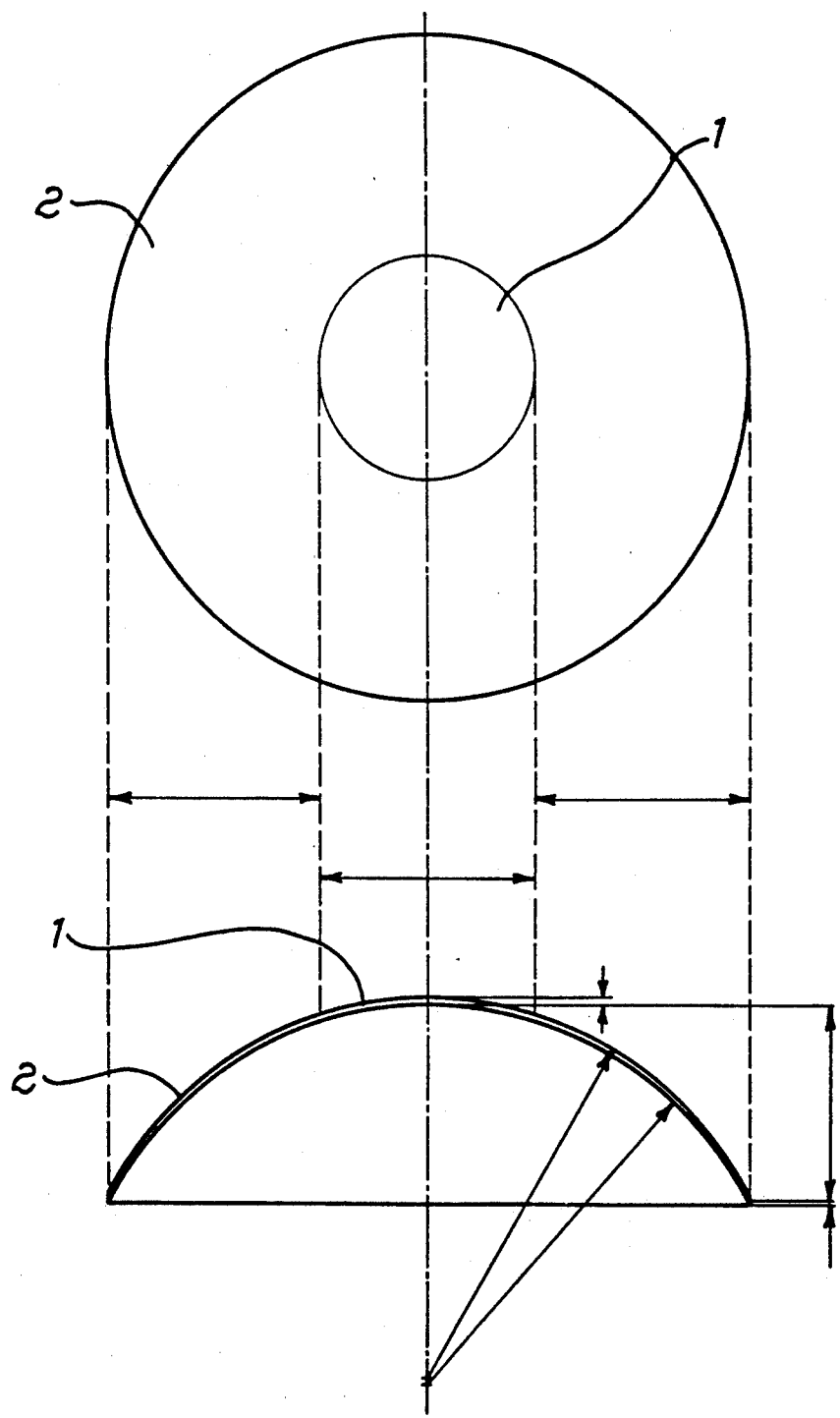
FIG. 3 is a schematical plan view of a multifocal spherical lens, still according to this invention.

As it is shown in FIGS. 1 to 3, wherein the mutual dimension ratios of the various details are exaggerated for sake of clarity, the lenses according to this invention substantially comprise a central spherical area 1, at least one progressive non-spherical area 2, coaxial and adjacent to the former area, and a peripheral lenticular area 3.

Referring now more particularly to the single FIGS. 1 to 3, there is reported some examples of input data to the manufacturing lathe control computer, and of output results given in reply by the computer, which are forwarded as control signals for operating said lathe.

EXAMPLE 1

Manufacturing of a positive multifocal contact lens having a progressive eccentricity.

In a computer connected to a lathe for manufacturing contact lenses, the following values are input: refractive index 1.510; sagittal 2.92 mm; junction thickness 0.15 mm; base curve radius 7.05 mm; dioptrical power 0.00; additional dioptrical power 1.49; diameter of the optical area 8.00 mm; total diameter 11.50 mm; starting blank total thickness 2.00 mm.

According to a special program, the computer processes the input data and provides in reply the following output results: outer optical curve radius 7.11 mm; central thickness 0.17 mm; raising at the edge 0.03 mm; thickness gauge radius 8.94 mm; arm −4.99 mm; lenticular curve radius 7.01 mm; thickness gauge radius 7.02 mm. The values thus obtained are automatically sent as input data to the lathe which machines the lens outer surface, through carriage displacements.

FIG. 1 shows a type of lens manufactured according to this example.

EXAMPLE 2

Manufacturing of a negative multifocal contact lens having a progressive eccentricity.

Following the same procedure as reported in Example 1, the input data to the computer are the following: refractive index 1.510, sagittal 2.92 mm; central thickness 0.06 mm; base curve radius 7.00 mm; dioptrical power −7.00; additional dioptrical power 3.00; radius of the optical area 9.00 mm; total diameter 11.50 mm; starting blank total thickness 2.00 mm.

The output values from the computer are: outer optical curve radius 7.76 mm; raising at the edge 0.08 mm; thickness gauge radius 9.70 mm; arm −10.32 mm; lenticular curve radius 6.97 mm; thickness gauge radius 6.85 mm. FIG. 2 shows an example of the lens obtained according to the data listed above.

EXAMPLE 3

Manufacturing of a multifocal progressive eccentricity contact lens.

Following the same procedure as reported in Example 1, the input data to the computer are the following: refractive index 1.510; sagittal 2.92 mm; base radius 7.05 mm; dioptrical power −4.49; additional dioptrical power 4.49; total diameter 11.50 mm; starting blank total thickness 2.00 mm. The following output values are obtained: optical curve radius 7.55 mm; central thickness 0.10 mm; thickness gauge radius 9.45 mm; arm −3.79 mm. FIG. 3 shows an example of a lens obtained according to the data listed above.

Figure 4:
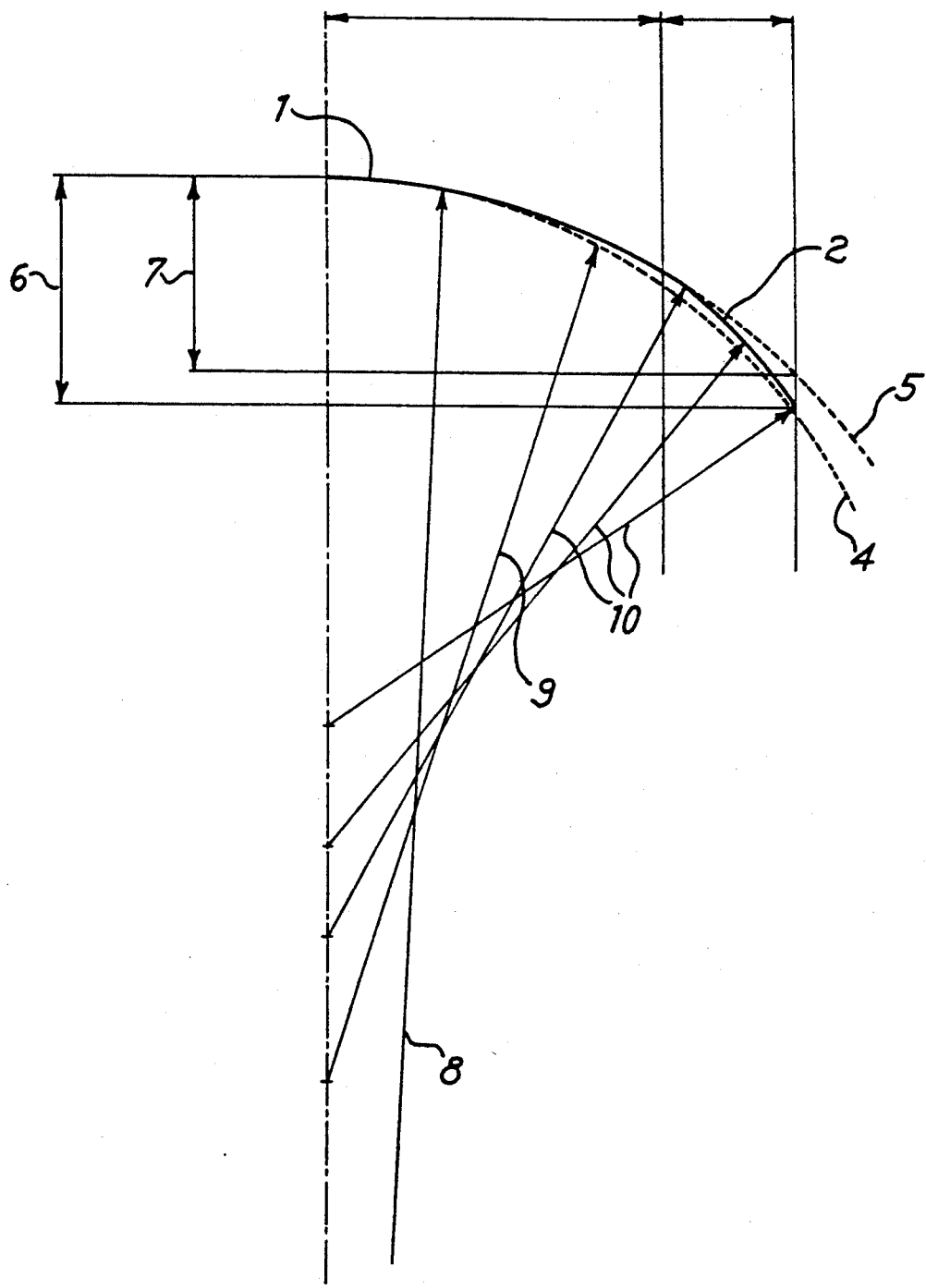
FIG. 4 is a diagram showing schematically, in cross section, the pattern of an inventive lens outer surface, going from the central spherical area to a first adjacent progressive non-spherical area.

In FIG. 4 there is shown schematically the outer surface pattern of one half of a contact lens according to this invention, wherein there is pointed out the linear progression of the non spherical shape of concentric area 2, provided for near range vision. Dashed line 4 shows the ideal curvature, starting from the intersection with the optical axis, of an ideal spherical curve for near range vision, while dashed line 5 shows the pattern, still starting from the intersection with the optical axis, of the ideal curve of a spherical lens provided for far range vision. As it is shown by solid line 2, the actual pattern given to the outer surface of a contact lens according to this invention connects with a progressive deviation the two lines 4 and 5 whereby a progressive non-spherical curvature is obtained. Line 8 is the radius of curvature for far range vision while line 9 is the radius of curvature for near range vision, whereas lines 10 show the progressive radius of curvature variation of the non-spherical area 2, wherein the eccentricity variation of the surface obtained according to the inventive process is in general in the range between 0.01 mm and 0.03 mm for each degree of deviation of the corresponding radius. Double arrow 6 shows the sagittal of the curve provided as above, while double arrow 7 shows the sagittal of the ideal curve 5, relating to far range vision.

The multifocal lenses of the invention having a progressively eccentric and non-spherical curvature provide for a perfect far range vision, in any light condition, and in particular in the case of good light conditions, as usually available outdoors, whereby the pupil is contracted and covers almost exclusively the lens central area, while the near range vision is ensured, in particular indoors, wherein light conditions are always worse than daylight and the pupil is relatively expanded, by the one or more coaxial areas, adjacent to the central area and having progressive non-spherical curvature, in which case the pupil uses in particular the parallactic vision provided by the non-spherical area, also involving the circumfoveal area of the retina. The above features of the contact lenses according to this invention will be particularly valuable for car drivers whose eyes have to watch simultaneously the road (far range vision) and the dashboard instruments (near range vision), since transition from one area of the lens to the other takes place gradually and continuously without the discomfort caused by sudden changes of the dioptrical power.

While this invention has been described referring in particular to some particular embodiments thereof, it should be apparent that modifications and/or variations may be made thereto by those skilled in this art, without exceeding the scope of protection of the same invention.

I claim:

1. A multifocal contact lens for both hard and soft contact lenses with a machined front surface comprising substantially a spherically curved central area and one or more coaxial non-spherical adjacent area or areas, and characterized in that the aspherical curvature of said coaxial adjacent area or areas intrinsically has a progressive eccentricity that changes regularly according to fixed increments in a linear progression derived from the ratio of two end values such that a geometrical pattern is established to change the outer radius of said front surface of said coaxial adjacent area or areas starting from said central area at a progressive rate to obtain a sagittal for vision correction, the progressive variation eccentricity of said coaxial adjacent area or areas ranging between 0.01 and 0.03 per deviation degree of the corresponding radius of curvature.

2. The multifocal lens of claim 1, wherein said central area is designed for far range vision and at least the first or single coaxial non-spherical adjacent area or areas is designed for near range vision.

* * * * *